(12) United States Patent
Bruce et al.

(10) Patent No.: US 7,220,098 B2
(45) Date of Patent: May 22, 2007

(54) WEAR RESISTANT VARIABLE STATOR VANE ASSEMBLIES

(75) Inventors: Robert William Bruce, Loveland, OH (US); Jerry Donald Schell, Evendale, OH (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 11/015,936

(22) Filed: Dec. 17, 2004

(65) Prior Publication Data

US 2005/0232757 A1 Oct. 20, 2005

Related U.S. Application Data

(63) Continuation-in-part of application No. 10/445,428, filed on May 27, 2003, now Pat. No. 7,094,022.

(51) Int. Cl.
*F01D 9/02* (2006.01)

(52) U.S. Cl. ..................... 415/160; 415/200

(58) Field of Classification Search ......... 415/160, 415/200; 416/241 B; 428/698, 701, 704
See application file for complete search history.

(56) References Cited

U.S. PATENT DOCUMENTS

| | | | |
|---|---|---|---|
| 3,367,628 A * | 2/1968 | Fitton | 415/110 |
| 3,601,414 A | 8/1971 | Rao | |
| 3,620,799 A | 11/1971 | Hoelscher et al | |
| 3,623,736 A | 11/1971 | Petrie et al. | |
| 3,623,981 A | 11/1971 | Giltrow et al. | |
| 3,633,926 A | 1/1972 | Hryniszak et al. | |
| 3,689,178 A | 9/1972 | Faber et al. | |
| 3,695,777 A | 10/1972 | Westphal et al. | |
| 3,711,171 A | 1/1973 | Orkin et al. | |
| 3,719,427 A | 3/1973 | Davis | |
| 3,764,189 A | 10/1973 | Prostler et al. | |
| 3,788,763 A | 1/1974 | Nickles | |
| 3,795,430 A | 3/1974 | Farley | |
| 3,817,719 A | 6/1974 | Schilke et al. | |
| 3,821,111 A | 6/1974 | Abe et al. | |
| 3,845,994 A | 11/1974 | Trey | |
| 3,873,168 A | 3/1975 | Viola et al. | |
| 3,879,831 A | 4/1975 | Rigney et al. | |
| 3,966,352 A | 6/1976 | White et al. | |

(Continued)

FOREIGN PATENT DOCUMENTS

EP 0 207 915 A1 6/1986

(Continued)

*Primary Examiner*—Ninh H. Nguyen
(74) *Attorney, Agent, or Firm*—McNees Wallace & Nurick LLC (57) ABSTRACT

A variable gas turbine compressor vane assembly comprising a case structure comprising a cavity. A compressor vane is at least partially disposed inside the cavity in the case structure. The portion of the compressor vane is rotatably supported inside the cavity. A wear coating is disposed on at least a portion of a surface of the compressor vane. An antifriction coating is disposed on the wear coating. A bushing is disposed between the antifriction coating and the case structure. The bushing is in sliding contact with each of the antifriction coating and the case structure. The antifriction coating maintains a coefficient of friction between the antifriction coating and the bushing of equal to or less than about 0.95 in atmospheres substantially devoid of water vapor.

33 Claims, 4 Drawing Sheets

U.S. PATENT DOCUMENTS

| | | | |
|---|---|---|---|
| 3,984,158 A | 10/1976 | Sorensen et al. | |
| 4,025,227 A | 5/1977 | Greenberg et al. | |
| 4,050,844 A | 9/1977 | Miller et al. | |
| 4,059,316 A | 11/1977 | Alvarez et al. | |
| 4,105,263 A | 8/1978 | Sorensen et al. | |
| 4,109,031 A | 8/1978 | Marscher | |
| 4,140,834 A | 2/1979 | Marcantonio et al. | |
| 4,163,364 A | 8/1979 | Shirato et al. | |
| 4,207,658 A | 6/1980 | Sorenson | |
| 4,269,903 A | 5/1981 | Clingman et al. | |
| 4,302,149 A | 11/1981 | Smale | |
| 4,311,432 A | 1/1982 | Kildea | |
| 4,314,791 A | 2/1982 | Weiler | |
| 4,371,312 A * | 2/1983 | Tank | 415/200 |
| 4,404,263 A | 9/1983 | Hodes et al. | |
| 4,425,247 A | 1/1984 | Bely et al. | |
| 4,456,266 A | 6/1984 | Heinold | |
| 4,492,522 A | 1/1985 | Rossmann et al. | |
| 4,509,803 A | 4/1985 | Takenaka et al. | |
| 4,521,496 A | 6/1985 | Sara | |
| 4,548,254 A | 10/1985 | Roberts | |
| 4,559,248 A | 12/1985 | Sumiyoshi et al. | |
| 4,604,030 A * | 8/1986 | Naudet | 415/126 |
| 4,618,269 A | 10/1986 | Badrak et al. | |
| 4,619,580 A | 10/1986 | Snyder | |
| 4,664,595 A | 5/1987 | Tsuji et al. | |
| 4,728,448 A | 3/1988 | Sliney | |
| 4,733,716 A | 3/1988 | Tominaga et al. | |
| 4,808,069 A | 2/1989 | Bonner et al. | |
| 4,832,993 A | 5/1989 | Coulon | |
| 4,834,613 A | 5/1989 | Hansen et al. | |
| 4,834,622 A | 5/1989 | Schuh | |
| 4,838,746 A | 6/1989 | Owsianny et al. | |
| 4,867,639 A | 9/1989 | Strangman | |
| 4,871,266 A * | 10/1989 | Oda | 384/42 |
| 4,875,532 A | 10/1989 | Langford, Jr. | |
| 4,879,052 A | 11/1989 | Mullin | |
| 4,910,086 A | 3/1990 | Kawakami et al. | |
| 4,913,563 A | 4/1990 | Veronesi et al. | |
| 5,064,727 A | 11/1991 | Naik et al. | |
| 5,066,540 A | 11/1991 | Mosser et al. | |
| 5,066,546 A | 11/1991 | Materkowski | |
| 5,100,848 A | 3/1992 | Enomoto et al. | |
| 5,149,250 A | 9/1992 | Plemmons et al. | |
| 5,161,898 A | 11/1992 | Drake | |
| 5,162,157 A | 11/1992 | Tanaka et al. | |
| 5,222,360 A | 6/1993 | Antuna et al. | |
| 5,244,587 A | 9/1993 | Ito et al. | |
| 5,269,798 A | 12/1993 | Winkler | |
| 5,277,073 A | 1/1994 | Ruiz et al. | |
| 5,281,087 A | 1/1994 | Hines | |
| 5,294,355 A | 3/1994 | King et al. | |
| 5,308,226 A | 5/1994 | Venkatasubbu et al. | |
| 5,352,540 A | 10/1994 | Schienle et al. | |
| 5,364,209 A | 11/1994 | Santhanam et al. | |
| 5,388,866 A | 2/1995 | Schlosser | |
| 5,434,210 A | 7/1995 | Rangaswamy et al. | |
| 5,458,460 A | 10/1995 | Okada et al. | |
| 5,470,494 A | 11/1995 | Umeda | |
| 5,507,961 A | 4/1996 | Forster et al. | |
| 5,517,817 A | 5/1996 | Hines | |
| 5,518,639 A | 5/1996 | Luk et al. | |
| 5,536,022 A | 7/1996 | Sileo et al. | |
| 5,551,853 A | 9/1996 | Cherry et al. | |
| 5,554,309 A | 9/1996 | Bruce et al. | |
| 5,560,991 A | 10/1996 | Patel et al. | |
| 5,587,217 A | 12/1996 | Chao et al. | |
| 5,589,012 A | 12/1996 | Hobby et al. | |
| 5,593,275 A | 1/1997 | Venkatasubbu et al. | |
| 5,622,473 A | 4/1997 | Payling | |
| 5,628,617 A | 5/1997 | Dalton et al. | |
| 5,695,326 A | 12/1997 | Oka et al. | |
| 5,714,700 A | 2/1998 | Nishida et al. | |
| 5,723,800 A | 3/1998 | Yoshimoto et al. | |
| 5,725,313 A | 3/1998 | Singh et al. | |
| 5,731,045 A | 3/1998 | Dearnaley et al. | |
| 5,747,428 A | 5/1998 | Khorramian | |
| 5,755,817 A | 5/1998 | Prouty et al. | |
| 5,807,072 A | 9/1998 | Payling | |
| 5,813,830 A | 9/1998 | Smith et al. | |
| 5,839,880 A | 11/1998 | Okada et al. | |
| 5,856,378 A | 1/1999 | Ring et al. | |
| 5,868,398 A | 2/1999 | Maier et al. | |
| 5,891,522 A | 4/1999 | Olson | |
| 6,068,813 A | 5/2000 | Semel | |
| 6,073,537 A | 6/2000 | Noda et al. | |
| 6,086,327 A | 7/2000 | Mack et al. | |
| 6,093,482 A | 7/2000 | Park et al. | |
| 6,102,656 A | 8/2000 | Nissley et al. | |
| 6,129,533 A | 10/2000 | Brandt et al. | |
| 6,135,712 A | 10/2000 | Chevrollier et al. | |
| 6,139,261 A | 10/2000 | Bishop et al. | |
| 6,146,093 A | 11/2000 | Lammas et al. | |
| 6,164,846 A | 12/2000 | Chatterjee et al. | |
| 6,170,990 B1 | 1/2001 | Hawkins | |
| 6,177,178 B1 | 1/2001 | Ostlund et al. | |
| 6,184,333 B1 | 2/2001 | Gray | |
| 6,190,124 B1 | 2/2001 | Freling et al. | |
| 6,192,585 B1 | 2/2001 | Buchanan, Jr. et al. | |
| 6,210,106 B1 | 4/2001 | Hawkins | |
| 6,264,369 B1 | 7/2001 | Mesing et al. | |
| 6,331,509 B1 | 12/2001 | Heimann et al. | |
| 6,358,002 B1 | 3/2002 | Good et al. | |
| 6,368,672 B1 | 4/2002 | Thompson et al. | |
| 6,386,763 B1 | 5/2002 | Mack et al. | |
| 6,440,580 B1 | 8/2002 | Berger et al. | |
| 6,451,454 B1 | 9/2002 | Hasz et al. | |
| 6,472,075 B1 | 10/2002 | Niwa | |
| 6,474,941 B2 | 11/2002 | Dingwell et al. | |
| 6,481,960 B2 | 11/2002 | Bowen | |
| 6,485,830 B1 | 11/2002 | Komorita et al. | |
| 6,508,619 B1 | 1/2003 | Bosen | |
| 6,511,945 B1 | 1/2003 | Ramstedt | |
| 6,517,583 B1 | 2/2003 | Pope et al. | |
| 6,582,190 B2 | 6/2003 | Jinnai | |
| 6,605,160 B2 | 8/2003 | Hoskin | |
| 6,613,462 B2 | 9/2003 | Macki et al. | |
| 6,638,609 B2 | 10/2003 | Nordgren et al. | |
| 6,655,845 B1 | 12/2003 | Pope et al. | |
| 6,660,133 B2 | 12/2003 | Penich et al. | |
| 6,660,405 B2 | 12/2003 | Lau et al. | |
| 6,667,262 B2 | 12/2003 | Agarwala et al. | |
| 6,696,392 B2 | 2/2004 | Naik et al. | |
| 6,734,147 B2 | 5/2004 | Levy | |
| 6,749,951 B1 * | 6/2004 | Darolia et al. | 428/615 |
| 6,767,657 B1 * | 7/2004 | Nagasaka et al. | 428/698 |
| 6,887,035 B2 * | 5/2005 | Bruce | 415/160 |
| 2001/0016091 A1 | 8/2001 | Mesing et al. | |
| 2001/0022934 A1 | 9/2001 | Mashey | |
| 2002/0058143 A1 | 5/2002 | Hunt et al. | |
| 2002/0071760 A1 | 6/2002 | Dingwell et al. | |
| 2002/0154991 A1 | 10/2002 | Bowen | |
| 2002/0189722 A1 | 12/2002 | Hasz et al. | |

FOREIGN PATENT DOCUMENTS

| | | |
|---|---|---|
| EP | 0 286 127 A1 | 4/1988 |
| EP | 0 520 520 A1 | 4/1988 |
| EP | 0 620 286 A1 | 10/1994 |
| EP | 1024252 A | 8/2000 |
| EP | 1 336 764 A1 | 11/2001 |
| EP | 1482129 A | 12/2004 |
| JP | 59-128992 | 1/1983 |
| JP | 02-233575 | 12/1985 |

| JP | 60-255255 | 12/1985 |
| JP | 04-308328 | 4/1991 |
| JP | 05-31268 | 5/1992 |
| JP | 04-341503 A | 11/1992 |
| JP | 05-336693 | 12/1993 |
| JP | 07-57748 | 3/1995 |
| JP | 10-8182 | 6/1996 |
| JP | 08-281332 | 10/1996 |
| JP | 10-130625 | 10/1996 |
| JP | 11-131107 A | 5/1999 |
| JP | 2001-65702 | 8/1999 |
| JP | 2001-44204 | 6/2000 |
| WO | WO 97-12999 | 4/1997 |
| WO | WO 99-16565 | 4/1999 |
| WO | WO 01-00402 A1 | 6/2000 |
| WO | WO 01-46324 A2 | 10/2000 |

* cited by examiner

WEAR RESISTANT VARIABLE STATOR VANE ASSEMBLIES

CROSS-REFERENCE TO RELATED APPLICATIONS

This application is a Continuation-in-Part of U.S. patent application Ser. No. 10/445,428 filed on May 27, 2003 now U.S. Pat. No. 7,094,022, claims priority to that application, and incorporates that application by reference in its entirety.

BACKGROUND OF THE INVENTION

This invention relates generally to gas turbine engine variable stator vane assemblies and, more particularly, to wear resistant coatings used within the variable stator vane assembly.

In a gas turbine engine, air is drawn into the front of the engine, compressed by a shaft-mounted compressor, and mixed with fuel. The compressor is made up of several rows or stages of compressor stator vanes and corresponding rows or stages of compressor rotor blades there between. The stator vane rows are situated between the rotor blade rows and direct airflow toward downstream rotor blades on the rotor blade row. After leaving the compressor, the air/fuel mixture is combusted, and the resulting hot combustion gases are passed through the turbine section of the engine. The flow of hot combustion gases turn the turbine by contacting an airfoil portion of the turbine blade, which in turn rotates the shaft and provides power to the compressor. The hot exhaust gases exit from the rear of the engine, driving the engine forward. Optionally, a bypass fan driven by a shaft extending from the turbine section, which forces air around the center core of the engine and provides additional thrust to the engine.

To increase the operating capacity of the compressor, at least some of the compressor stator vane rows are designed with vanes that can rotate in around an axis that is in its longitudinal direction to adjust the angular orientation of the vane with respect to the airflow traveling through the compressor. The adjustment of the angular orientation allows control of the amount of air flowing through the compressor. Variable stator vane designs typically allow for about 45° rotation of the stator vane to optimize compressor performance over the operating envelope of a gas turbine engine. The variable stator vane structures include an outer trunnion disposed in a complementary mounting boss in the stator casing for allowing rotation of the vane relative to the casing. A lever arm is fixedly joined to a coaxial stem extending outwardly from the vane trunnion. The distal end of the lever arm is operatively joined to an actuation ring that controls the angle of the vane. All of the vane lever arms in a single row are joined to a common actuation ring for ensuring that all of the variable vanes are positioned relative to the airflow in the compressor stage at the same angular orientation.

A known variable stator vane assembly includes a bushing and washer disposed between a trunnion attached to a variable vane and a casing. The bushing and washer decrease the coefficient of friction between the trunnion and the casing and facilitate rotation of the vane, through the trunnion. The bushing and washer also help prevent wear of the trunnion and casing. A shroud may also be place between the trunnion and casing to prevent wear.

A number of structures in the gas turbine engine, including the bushing and washer structures, used with variable stator vanes are subjected to conditions of wear at temperatures ranging from low temperatures to highly elevated temperatures. In addition, the bushing and washers are subject to high altitude atmospheres. In addition to low temperatures, high altitude atmosphere includes little or no water vapor. Water vapor is required for conventional graphite containing lubricants to maintain lubricity.

Wear occurs when contacting surfaces of two components rub against each other. Typical results from wear include scoring of one or both surfaces, and/or material removal from one or both surfaces. In the bushing and washer system of the variable stator vane assembly, scoring may occur on one or both of the surface trunnion and the casing, both of which are expensive to repair and/or replace. As the surfaces are damaged, they become even more susceptible to the effects of wear as their effective coefficients of friction rise and wear debris is trapped between the wearing surfaces, so that the wear damage accelerates with increasing time in service. Wear debris may include material removed from the wearing surfaces due to wear, or may include foreign particles, such as dust or debris from the air traveling through the engine.

The wear conditions sometimes arise because it is not desirable or possible to firmly affix the two components together to prevent the rubbing action, because of the functionality of the components. An example is a cylindrical bushing used to support a variable stator vane in the compressor section of the gas turbine engine where the element inserted into the bushing (e.g., the vane trunnion) rotates or slides in contact with the surface of the bushing.

When a bushing and washer system fails due to excessive wear, serious problems for the gas turbine engine compressor may occur. The failure of the bushing and washer may create an increase in leakage of compressed air from the interior of the compressor through the variable stator vane assembly, which results in performance loss for the compressor. In addition, failure of the bushing and washer can result in contact between the stator vane and the casing, which causes wear and increases overhaul costs of the engine.

One known material for fabrication of bushing for variable stator vane assemblies is a specially developed composite of carbon fiber reinforcing rods in a polyamide resin matrix manufactured by E. I. Du Pont De Nemours and Company of Wilmington, Del. The bushings are commonly known as VESPEL®CP™ bushings. VESPEL® and CP™ are trademarks that are owned by E. I. Du Pont De Nemours and Company. The polyamide resin used in the VESPEL®CP™ bushings is commonly known as NR150™. The NR150™ trademark is owned by Cytec Technology Group of Wilmington, Del. Although the VESPEL®CP™ bushings have an extended life at temperatures 450–500° F. (232–260° C.), the VESPEL®CP™ bushing have an upper temperature limit of 600° F. (316° C.). Extended operation at temperatures at or above 600° F. (316° C.) limit their operational life. The polymer bushings do not withstand the combinations of high temperature and vibrational loading experienced in the operation of the gas turbine engine well, leading to a relatively short part life.

Another known method for reducing wear on the variable stator vane assembly is placing a carbon-containing antifriction coating on a surface in the variable stator vane assembly. This antifriction coating is a coating fabricated from a material that reduces the coefficient of friction between the surface of the trunnion and the surface of the casing. One carbon-containing component known for antifriction coating is graphite. However, graphite has the disadvantage that water vapor is required to maintain lubricity.

Atmospheres at aircraft cruise altitudes do not have enough water vapor present for graphite to be lubricious. Graphite also has the disadvantage that graphite has poor tribological properties in applications that require reciprocating motion. An additional disadvantage of graphite is that graphite begins to oxidize rapidly at temperatures at or greater than 500° C. (932° F.). Some variable stator vane systems may experience temperatures in excess of 500° C. (932° F.). Therefore, a replacement material for graphite in antifriction coating is needed.

Attempts have also been made to coat the stator vane trunnion with a single wear coating. The single wear coating attempts to incorporate the low coefficient of friction materials known in the art with hard, smooth wear resistant coating materials into a single coating on the vane trunnion. However, the single wear coating lacks the ability to maintain the properties of each of the individual components (i.e., fails to maintain both low coefficient of friction and wear resistance). In other words, the single wear coating does not provide all of the desired tribological properties (e.g., reduce wear and low coefficient of friction) required for extended operation of variable stator vanes subject to conditions of high temperature, vibration and high altitude atmospheres.

There is accordingly a need for an improved approach to the protection of gas turbine components, such as variable vane trunnion surfaces, variable vane casing surface or other surfaces in the gas turbine engine against the damage caused by wear. The present invention fulfills this need, and further provides related advantages.

SUMMARY OF THE INVENTION

The present invention is a variable gas turbine compressor vane assembly comprising a case structure comprising a cavity. A compressor vane is at least partially disposed inside the cavity in the case structure. The portion of the compressor vane is rotatably supported inside the cavity. A wear coating is disposed on at least a portion of a surface of the compressor vane. An antifriction coating is disposed on the wear coating. A bushing is disposed between the antifriction coating and the case structure. The bushing is in sliding contact with each of the antifriction coating and the case structure. The antifriction coating maintains a coefficient of friction between the antifriction coating and the bushing of equal to or less than about 0.95 in atmospheres substantially devoid of water vapor.

The variable stator vane assembly, according to the present invention, is subject to reduced wear while having an improved resistance to vibration and improved resistance to elevated temperatures, where the variable stator vane assembly may be utilized at temperatures greater than about 1000° F. (538° C.), including operational temperatures of greater than about 1200° F. (649° C.).

Another advantage of the variable stator vane assembly, according to the present invention, is that the wear coating and antifriction coating combination reduces wear and maintains desirable tribological properties in high altitude atmospheres having little or no water vapor.

Another advantage of the variable stator vane assembly, according to the present invention, is that the variable stator vane assembly provides an efficiency improvement in the turbine engine while reducing overhaul costs caused by wear resulting from metal on metal contact between the stator casing surface and the stator vane surface.

Another advantage of the variable stator vane assembly, according to the present invention, is that the materials used in the variable stator vane assembly of the present invention, including the antifriction coating, can readily withstand the higher temperatures of operation utilized in current advanced engine designs. The materials used in the antifriction coating of the present invention can be utilized at temperatures greater than about 1000° F. (538° C.), including operational temperatures of greater than about 1200° F. (649° C.), without deterioration due to the combined effects of temperature, vibration, and high altitude atmosphere.

Another advantage of the variable stator vane assembly according to the present invention is that the antifriction coating is resilient and regenerates in areas where the antifriction coating is rubbed thin or cleaned off the wear surface.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
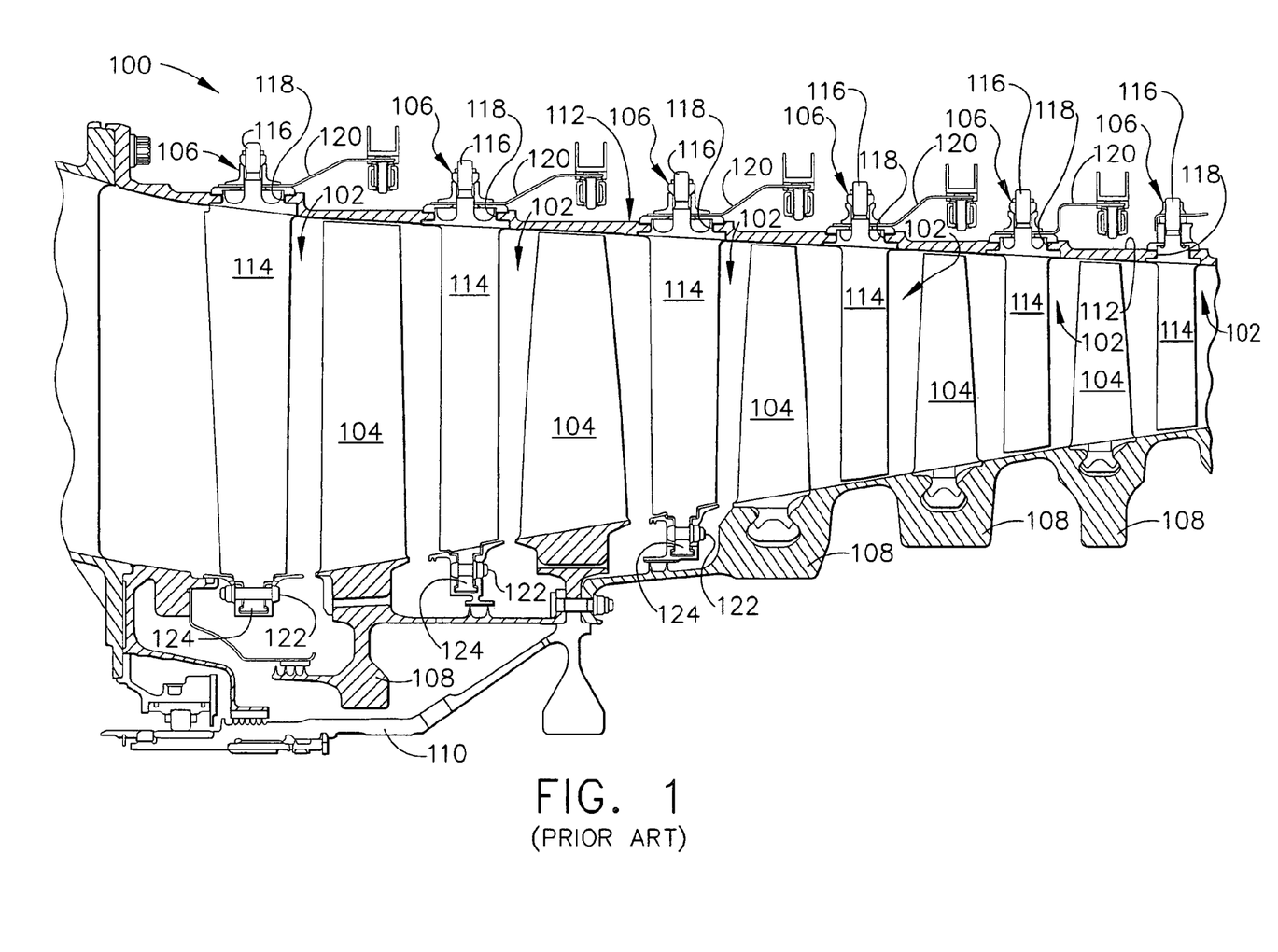
FIG. 1 is a schematic view of a portion of a prior art high-pressure compressor for a turbine engine.

FIG. 1 is a schematic view of a section of a known high-pressure compressor 100 for a turbine engine (not shown). Compressor 100 includes a plurality of stages 102, and each stage 102 includes a row of rotor blades 104 and a row of variable stator vane assemblies 106. Rotor blades 104 are typically supported by rotor disks 108, and are connected to a rotor shaft 110. Rotor shaft 110 is a high-pressure shaft that is also connected to a high-pressure turbine (not shown). Rotor shaft 110 is surrounded by a stator casing 112 that supports variable stator vane assemblies 106.

Each variable stator vane assembly 106 includes a variable vane 114 and a vane stem 116. Vane stem 116 protrudes through an opening 118 in casing 112. Variable vane assemblies 106 further include a lever arm 120 extending from variable vane 114 that is utilized to rotate variable vanes 114. The orientation of variable vanes 114 relative to the flow path through compressor 100 control airflow therethrough. Some variable vane assemblies 106 are secured to shroud 124 by bolts 122.

Variable vane assemblies 106 control airflow through compressor 100. However, variable vane assemblies 106 also provide a potential pathway for airflow to exit compressor 100, such as through openings 118. The loss of airflow through openings 118 reduces the efficiency of compressor 100.

Figure 2:
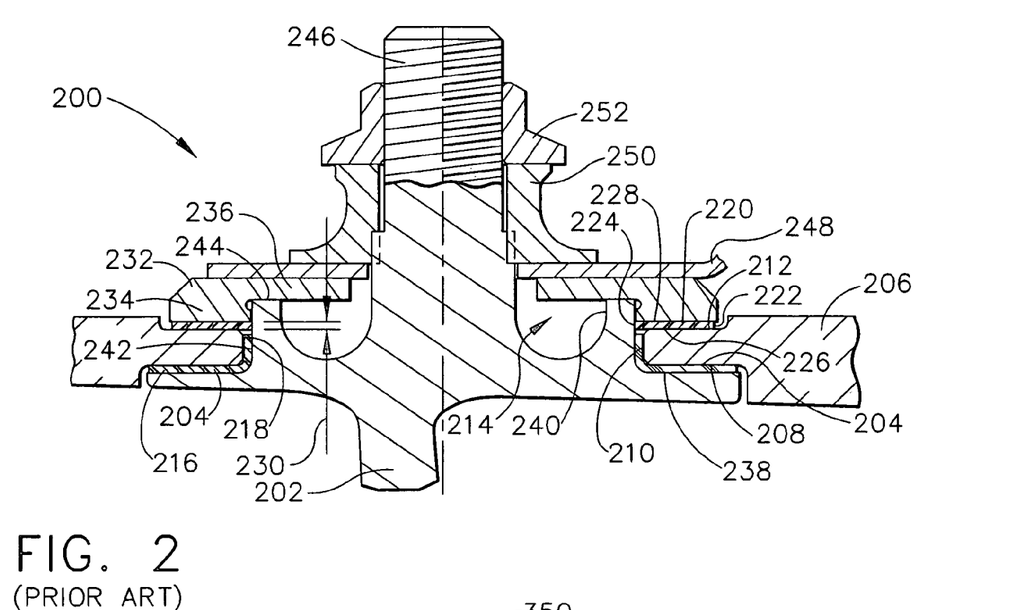
FIG. 2 is a cross-sectional view of a prior art variable vane assembly used in an aircraft engine high-pressure compressor.

FIG. 2 is a cross-sectional view of a known variable vane assembly 200. Variable vane assembly 200 includes a variable vane 202. A bushing 204 is positioned on variable vane 202. A casing 206 supports variable vane 202 and includes a first recessed portion 208, an inner portion 210, and a second recessed portion 212. An opening 214 is formed by inner portion 210.

Bushing 204 includes a first portion 216 and a second portion 218. Bushing first portion 216 is in direct contact with casing first recessed portion 208 and separates variable vane 202 from casing 206. Bushing second portion 218 contacts casing inner portion 210 and separates variable vane 202 from casing 206. Bushing first portion 216 extends substantially an entire length of casing first recessed portion 208. In addition, bushing second portion 218 extends substantially an entire length of casing inner portion 210 and is substantially perpendicular to bushing first portion 216. Bushing 204 prevents variable vane 202 from directly contacting casing 206.

Variable vane assembly 200 further includes a washer 220. Washer 220 is substantially flat and includes an outer diameter surface 222 and an inner diameter surface 224. More specifically, washer 220 includes a first wall 226, a second wall 228, and a thickness 230 that is substantially constant from outer diameter surface 222 to inner diameter surface 224. Washer 220 is in direct contact with casing second recessed portion 212 and extends substantially an entire length of casing second recessed portion 212.

Variable vane assembly 200 includes a spacer 232 in contact with washer 220. Washer 220 prevents contact between spacer 232 and casing second recessed portion 212. Spacer 232 includes a first portion 234 and a second portion 236. Spacer first portion 234 contacts washer 220 and has a length substantially equal to a radial length of washer 220. Spacer 232 is separated from bushing 204 by washer 220. Bushing 204 and washer 220 do not contact each other. Washer 220 prevents spacer 232 from contacting casing 206.

Variable vane 202 also includes a first portion 238, a ledge 240 having an outer portion 242, and a spacer-seating portion 244. Ledge 240 surrounds a vane stem 246. Vane stem 246 (corresponding to FIG. 1, 116) and ledge 240 extend through opening 214 (corresponding to FIG. 1, 118) in casing 206 (corresponding to FIG. 1, 112). Bushing second portion 218 extends along inner portion 210 of casing 206. Bushing second portion 218 prevents ledge outer portion 242 from contacting casing inner portion 210.

Variable vane assembly 200 also includes a lever arm 248 positioned around vane stem 246 and contacting spacer 232. Lever arm 248 is utilized to adjust the angle of variable vane 202, and thus alter the flow of air through the compressor.

In addition, variable vane assembly 200 includes a sleeve 250 contacting lever arm 248, and a lever arm nut 252 contacting sleeve 250. Lever arm nut 252 cooperates with vane stem 246 and maintains variable vane assembly 200 in contact with casing 206.

Variable vane assembly 200 is assembled by placing bushing 204 on variable vane 202 such that first portion 216 and second portion 218 contact variable vane 202 and are substantially perpendicular. Variable vane 202 and bushing 204 extend through opening 214 of casing 206.

Washer 220 is placed on casing 206 adjacent bushing 204. Spacer 232 is positioned on variable vane 202 and contacts washer 220. Lever arm 238 is positioned over vane stem 246 and contacts spacer 232. Sleeve 250 is positioned over vane stem 246 and contacts lever arm 248. Finally, lever arm nut 252 is positioned over vane stem 246 and contacts sleeve 250.

Washer 220 and bushing 204 form a bearing assembly used in variable vane assembly 200 and may be used, for example, in a high-pressure compressor. Washer 220 and bushing 204 may be utilized in other environments such as a rotor vane assembly, a low-pressure compressor variable vane assembly, a high-pressure turbine, or a low-pressure turbine.

Figure 3:
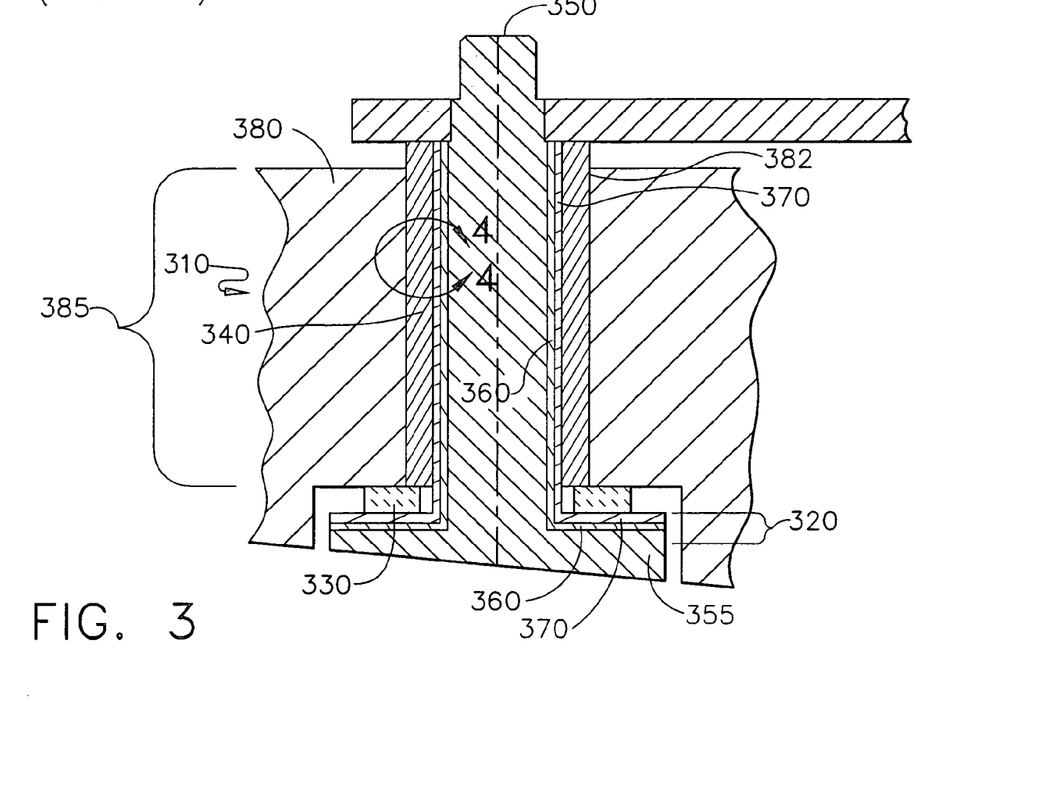
FIG. 3 is a cross-section view of a variable vane bushing assembly of the present invention used in a variable vane assembly of the present invention.

FIG. 3 is a cross-sectional view of variable vane bushing assembly 310 according to the present invention. Variable vane bushing assembly 310 includes casing 380 having a substantially cylindrical opening extending through thickness 385 of casing 380. Vane trunnion 350 and bushing 340 are disposed inside the cylindrical opening. Casing 380 supports and allows rotation of trunnion 350 and bushing 340 in casing 380. Bushing 340 provides a barrier between trunnion 350 and casing 380. Trunnion 350 rotates about the same axis as the cylindrical opening in casing 380 and rubs against bushing 340. Bushing 340 prevents vane trunnion 350 from directly contacting casing 380, thereby reducing wear on each of bushing 340 and vane trunnion 350.

In addition to bushing 340, a wear coating 360 and an antifriction coating 370 are also disposed in between vane trunnion 350 and casing 380. Wear coating 360 is disposed on the surface of vane trunnion 350 and on the upper face of vane button 320. Antifriction coating 370 is disposed on the inside of bushing 340, on the wear coated vane trunnion 350, on wear coated vane button 320 or a combination thereof.

Variable vane bushing assembly 310 also includes a washer 330 disposed between casing 380 and vane button 320. Vane button 320 is located on the surface of the stator vane perpendicular to the surface of trunnion 350 extending to the edges of stator vane 355. The upper face of vane button 320, like the adjacent vane trunnion 350, is coated with a wear coating 360. Antifriction coating 370 is disposed on wear coated vane button 320 to form a barrier between washer 330 and wear coated vane button 320. Vane button 320 having wear coating 360 and antifriction coating 370 rub against washer 330 as vane 355 rotates. Washer 330 is preferably the same material as bushing 340 to promote even wear of trunnion 350 and vane button 320. Washer 330 contacts and rubs against casing 380, vane button 320, and bushing 340.

Washer 330 and bushing 340 form a bearing assembly that facilitates the motion of variable stator vane 355. The relative motion of trunnion 350 with respect to casing 380 results in frictional contact between trunnion 350, vane button 320, bushing 340 and casing 380. The wear on trunnion 350 and vane button 320 is reduced by wear coating 360 and antifriction coating 370. Wear coating 360 is disposed on trunnion 350 and wear button 320. Antifriction coating 370 provides a barrier between the surfaces of bushing 340 and wear coating 360. Antifriction coating 370 may be disposed on wear coating 360, on bushing 340 or on a combination thereof.

Figure 4:
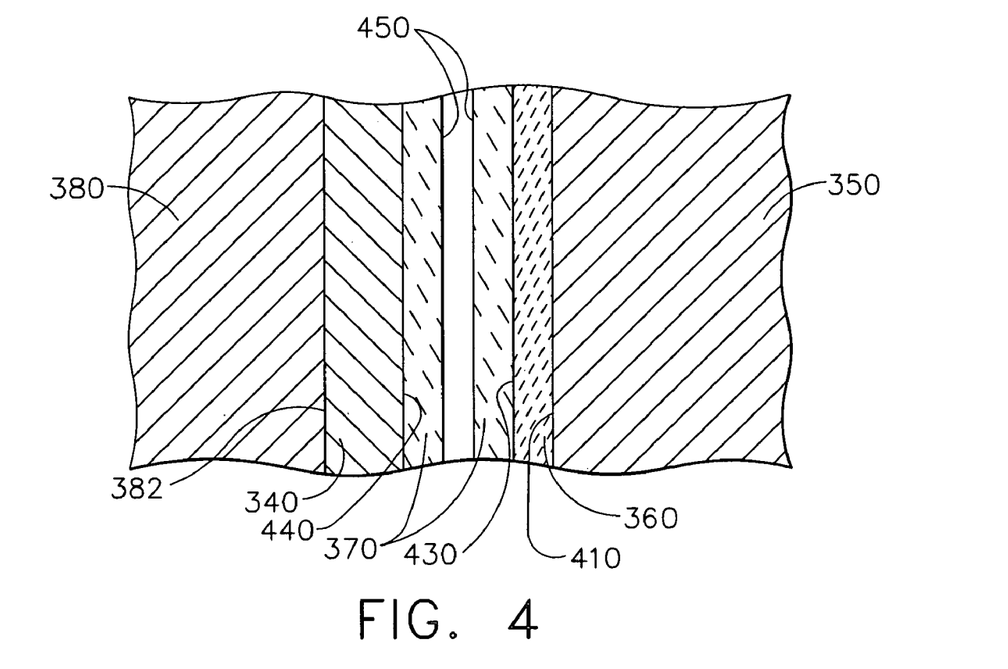
FIGS. 4–6 are schematic views of coating arrangements according to the present invention.
Figure 5:
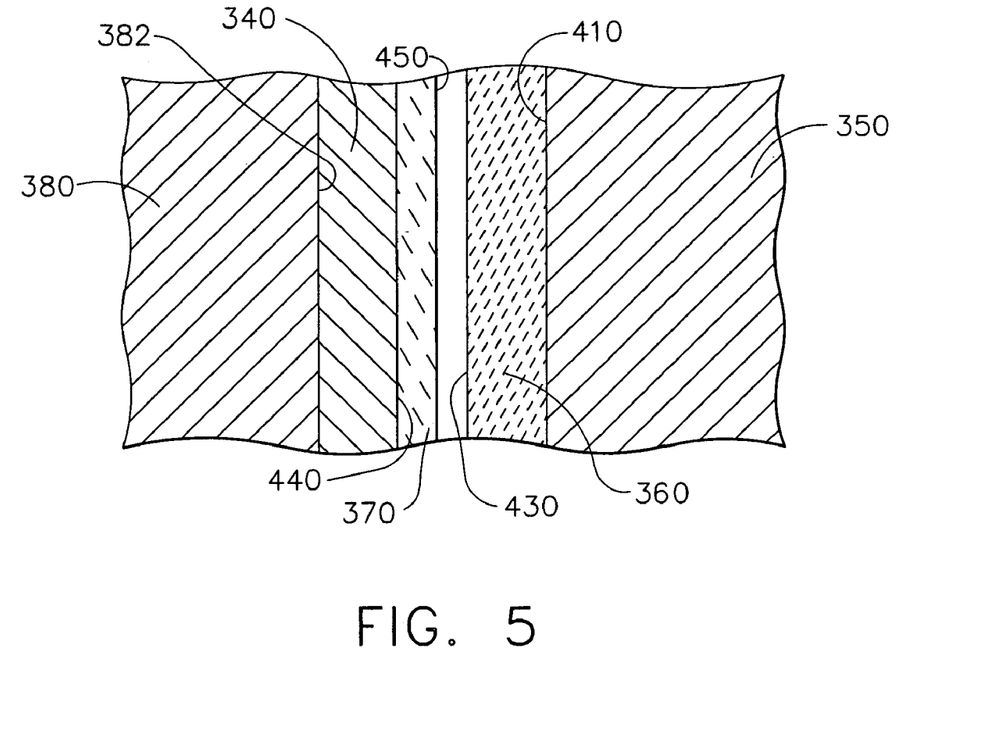
Figure 6:
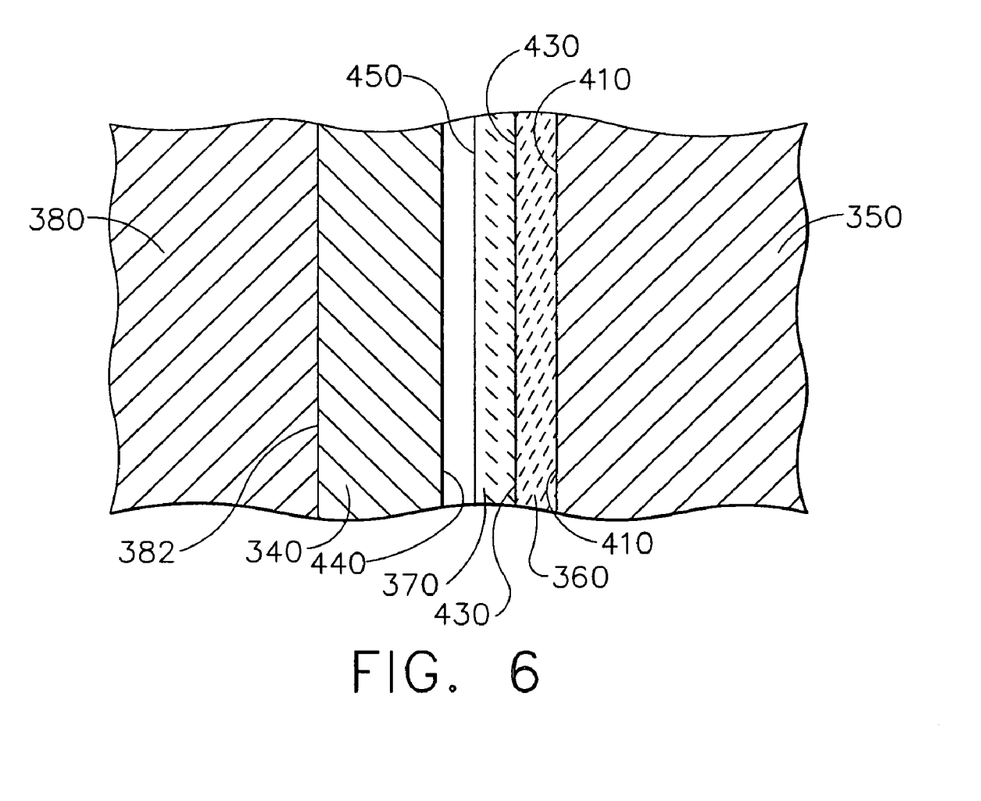

FIGS. 4–6 shows an enlarged cross-sections taken from region 4—4 from FIG. 3. FIGS. 4–6 illustrate different embodiments of the present invention. The cross sections in FIGS. 4–6 each include casing 380, trunnion 350, wear coating 360 and antifriction coating 370. In each of FIGS. 4–6, wear coating 360 is disposed on trunnion 350. Wear coatings 360 may include, but are not limited to, tungsten carbide or titanium nitride. FIGS. 4–6 illustrate alternate locations for placement of antifriction coating 370. Antifriction coating 370 may be disposed on wear coating 360, on bushing 340, or on a combination thereof. Antifriction coating 370 may include, but is not limited to tungsten sulfide, bismuth telluride or bismuth oxide in a binder of aluminum phosphate or titanium oxide.

FIG. 4 shows an enlarged cross-section taken from region 4—4 from FIG. 3 showing an embodiment of the present invention. FIG. 4 includes casing 380, bushing 340, antifriction coating 370, wear coating 360 and trunnion 350. Trunnion 350 rotates inside casing 380 during operation of variable stator vane 355. Bushing 340 is disposed between trunnion 350 and casing 380 and is subject to frictional rubbing forces on bushing 340 from rotating trunnion 350. Casing surface 382 and the bushing 340 are in contact and may experience rubbing due to relative motion of bushing 340 against casing surface 382. Surface 410 of trunnion 350 includes wear coating 360 to help reduce wear of trunnion 350. Wear coating 360 may include, but is not limited to, tungsten carbide or titanium nitride. Trunnion 350 also includes antifriction coating 370 disposed on wear coating surface 430. In the embodiment shown in FIG. 4, an additional antifriction coating 370 is disposed on surface 440 of bushing 340. Antifriction coating surfaces 450 rub are in frictional contact and rub against each other. The embodiment shown in FIG. 4 has the benefit that it permits antifriction coating 370 on bushing 340 to rub against antifriction coating 370 on wear coating surface 430. Antifriction coating surfaces 450 may contact each other and rub against each other in frictional contact. The embodiment shown in FIG. 4 has the benefit that antifriction coating 370 is coated onto wear coating 360 providing desirable tribological properties. In particular, the combination of the hard, wear resistant wear coating 360 and the soft, lubricious antifriction coating 370 provide sliding surfaces that simultaneously have a low coefficient of friction and increased wear resistance. The additional antifriction coating 370 on opposing surfaces provides additional coating protection and lubricious properties for each of the bushing surface 440 and the wear coating surface 430. Additionally, having antifriction surfaces 450 oppose each other allows additional material to migrate back and forth along surfaces 450 increasing uniformity and regeneration of the antifriction coating 370 along the bushing surface 440 and the wear coating surface 430. Uniformity and regeneration result from migration of the material making up antifriction coating 370 from location to location along the surfaces, providing uniform distribution of antifriction coating 370 and regeneration of antifriction coating 370 in areas having less antifriction coating material.

FIG. 5 shows an enlarged cross-section taken from region 4—4 from FIG. 3 showing an alternate embodiment of the present invention. FIG. 5 shows casing 380, bushing 340, wear coating 360 and vane trunnion 350, substantially as described above with respect to FIG. 4. As in the embodiment illustrated in FIG. 4, wear coating 360 is disposed on surface 410 of vane trunnion 350. Casing surface 382 and bushing 340 are in contact and may experience rubbing due to relative motion of bushing 340 against casing surface 382. In the embodiment illustrated by FIG. 5, the surface 440 of bushing 340 is coated with an antifriction coating 370. Unlike the embodiment shown in FIG. 4, no antifriction coating 370 is present on the wear coating 360. The antifriction coating surface 450 and surface 430 of the wear coating 360 may contact each other and rub against each other in frictional contact. The embodiment shown in FIG. 5 has the benefit that antifriction coating 370 is coated onto bushing 340. Bushing 340 is removable from casing 380, making coating of the bushing relatively simple. Therefore, the application of antifriction coating 370 requires less equipment and labor than applying antifriction coating 370 to surface 430 of wear coating 360. Additionally, material making up antifriction coating 370 migrates from location to location along surface 440 of bushing 340, providing uniform distribution of antifriction coating 370 and regeneration of antifriction coating 370 in areas having less antifriction coating material. In service, bushing 340 can be readily replaced with a replacement bushing carrying a fresh supply of antifriction coating 370.

FIG. 6 shows an enlarged cross-section taken from region 4—4 from FIG. 3 showing an alternate embodiment of the present invention. FIG. 6 shows casing 380, bushing 340, wear coating 360 and vane trunnion 350 substantially as described above with respect to FIG. 4. As in the embodiment illustrated in FIG. 4, wear coating 360 is disposed on surface 410 of vane trunnion 350. Casing surface 382 and bushing 340 are in contact and may experience rubbing due to relative motion of bushing 340 against casing surface 382. In the embodiment illustrated by FIG. 6, surface 430 of wear coating 360 is coated with antifriction coating 370. Unlike FIGS. 4 and 5, no antifriction coating 370 is initially present on bushing 340. In this embodiment, surface 450 of antifriction coating 370 and surface 440 of bushing 340 may contact each other and rub against each other in frictional contact. The embodiment shown in FIG. 6 has the benefit that antifriction coating 370 is coated onto wear coating 360 providing desirable tribological properties. In particular, the combination of the hard, wear resistant wear coating 360 and the soft, lubricious antifriction coating 370 provide sliding surfaces that simultaneously have a low coefficient of friction and increased wear resistance. Additionally, material making up antifriction coating 370 migrates from location to location along the surface 430 of wear coating 360, providing uniform distribution of antifriction coating 370 and regeneration of antifriction coating 370 in areas having less antifriction coating material. Applying antifriction coatings 370 to the entire vane trunnion 350 and upper face of the vane button 320 is a simple procedure. Inspection of the coating in those areas is also simple due to easy accessibility.

While FIG. 3 illustrates a bushing 340 and washer 330 configuration with an elongated cylindrical opening through the casing 380, which is known as a high boss design, the coating systems of the present invention are suitable for any variable stator vane configurations known in the art having wear surfaces. The alternate variable stator vane configurations include, but are not limited to, bushing arrangements with a shortened openings through the casing, which is known as low boss designs, bushing arrangements having more than one bushing, bushing arrangements having multiple bores through the casing, variable stator vane bearing arrangements having no bushings or wear surfaces other than bushings and combinations thereof. The present invention utilizes the combination of the relatively hard wear coating 360 in combination with a separate, relatively soft, lubricious antifriction coating 370, which may be placed on wear surfaces, including wear coatings 360 and component surfaces, within the variable stator vane assembly.

One embodiment of the present invention includes a variable stator vane assembly 310 having a vane structure 355 at least partially disposed inside an opening in a casing 380, a wear coating 360 on at least a portion of the surface of the vane structure, an antifriction coating 370 on at least a portion of the wear coating 360, and a bushing 340 disposed between the antifriction coating 370 and the casing 380. The antifriction coating 370 maintains a low coefficient of friction in high altitude atmospheres. The coefficient of friction maintained in the wear system of the variable stator vane in operating conditions (e.g., high temperature, high vibration, and high altitude atmosphere exposure) is equal to or less than 0.6 and preferably equal or less than 0.4. The coefficient of friction is measured between the two surfaces rubbing against each other within the variable stator vane assembly 310. The embodiment of the present invention shown in FIG. 4, the coefficient of friction between antifriction coating 370 on bushing 340 and antifriction coating 370 on wear coating 360 is less than or equal to about 0.6. The embodiment of the present invention shown in FIG. 5, the coefficient of friction between antifriction coating 370 and wear coating 360 is less than or equal to about 0.6. The embodiment of the present invention shown in FIG. 6, the coefficient of friction between antifriction coating 370 and bushing 340 is less than or equal to about 0.6.

The vane structure includes a vane trunnion 350 that is attached to the variable vane 355 and is at least partially disposed inside an opening in the casing. The vane structure, including the vane 355 and trunnion 350, may be fabricated from any suitable material, including but not limited to metals and alloys. Preferred materials include nickel-based superalloys, titanium and its alloys, cobalt-based superalloys, iron-based superalloys and stainless steel. The variable stator vane assembly 310 utilizes a bushing 340 to reduce wear between the vane trunnion 340 and the casing 380. The bushing may include a material selected from the group consisting of silicon nitride (e.g., $Si_3N_4$), tungsten carbide (e.g., WC) titanium carbide (e.g., TiC), cobalt-chromium-molybdenum alloys, zirconium oxide (e.g., $ZrO_2$) and combinations thereof. These bushings 340 are strong but relatively inflexible.

Wear coatings 360 are provided on metal surfaces to provide a surface 430 having desirable wear properties, such as high hardness and wear resistance. Materials used in the variable stator vane system 310 include materials that are suitable for receiving the wear coatings. Suitable material for receiving wear coatings may include, but are not limited to, nickel-based superalloys, titanium and its alloys, cobalt-based superalloys, iron-based superalloys and stainless steel. Wear coatings 360 provide a surface 430 that has the properties of being both hard and smooth and capable of receiving an antifriction coating 370. In one embodiment of the present invention, the vane trunnion 350 is coated with a cemented tungsten carbide. Cemented tungsten carbides include those tungsten carbides that include a sufficient amount of cobalt to impart wear resistance. Sufficient amounts of cobalt are typically about 6–20% by weight and preferably about 12% by weight. The wear coating 360 may be applied by a plasma spray technique or other suitable method known in the art. A suitable plasma spray technique is high velocity oxy-fuel (HVOF) spraying, although other plasma spray techniques such as low-pressure plasma spray (LPPS) and air plasma spraying (APS) can be used to successfully apply the coating. Alternatively, the trunnion 350 may be coated with a plasma vapor deposited (PVD) wear coating 360 of titanium nitride or tungsten carbide. The preferred coating is a relatively thin wear coating 360 of titanium nitride or tungsten carbide applied by PVD. These wear coatings 360 may be applied to a thickness as low as about 0.0002 inches and as high as about 0.010. Preferably, the coating thicknesses are in the range from about 0.001 to about 0.005 inches, including coating thickness of about 0.003 inches. The resultant wear coating 360 is a hard, smooth surface resistant to wear.

The present invention also utilizes an antifriction coating 370 placed between the wear coated bushing 340 and the vane trunnion 350. The antifriction coating 370 is preferably coated on surface 430 of the wear coating 360. However, the antifriction coating 370 may be coated on the surface of the bushing 340.

The antifriction coating 370 comprises a binder, a friction modifying agent, and, optionally, an additive. The binder of the antifriction coating 370 comprises a material selected from the group consisting of sodium silicate, aluminum phosphate, and titanium oxide. The friction-modifying agent is preferably dispersed substantially uniformly through the binder. The antifriction coating 370 reduces the coefficient of friction between bushing 340 and wear coating 360. Of the antifriction coating binders, aluminum phosphate and titanium oxide are preferred. As the variable stator vane bushing assembly 310 operates, the antifriction coating 370 may eventually be consumed. The antifriction coating 370 is resilient and regenerates in areas where the coating is rubbed thin or cleaned off the wear surface. The antifriction coating 370 is thin when the thickness on a portion of the surface is insufficient to provide sufficient lubricity to the sliding surfaces to maintain the coefficient of friction at the desired level. During operation, the antifriction coating 370 may migrate from location to location along the wear surface. The migration of the antifriction coating 370 allows areas that have less material or are rubbed completely off to receive antifriction coating material from other locations along the wear surface to regenerate the coating missing from the area rubbed thin or completely off.

The binder material for use in the antifriction coating 370 is any binder material that is tribologically compatible with all of the following materials: 1) water, 2) detergents used in the cleaning of gas turbine engine parts, 3) deicers known in the art used to deice aircraft in winter, 4) aircraft fuel, 5) oil and 6) hydraulic fluid. The materials are tribologically compatible if the binder in the antifriction coating 370 maintains tribological properties (e.g., lubricity and wear resistance) of the antifriction coating 370 when in contact with the surfaces subjected to sliding friction and in contact with the materials listed above. Suitable binder materials include, but are not limited to, sodium silicate, aluminum phosphate, titanium oxide and combinations thereof.

The friction modifier is any material that, when added to the binder, produces a friction coefficient suitable for rotating a stator vane in a variable stator vane assembly, capable of maintaining desirable tribological properties at high altitude atmospheres and and/or high temperatures. The high altitude atmospheres include atmospheres to which aircraft are exposed during flight. The high altitude atmosphere includes atmospheres having reduced water vapor. High temperature exposure is a result of the operation of the gas turbine engine. The compression of the gas and the combustion of the fuel result in high temperatures in gas turbine engines. Parts within the gas turbine engine are subject to high temperatures. The coating system of the present invention may find uses in parts within the gas turbine engine that are exposed to temperatures up to about 1200° F. Desirable tribological properties include, but are not limited to low coefficient of friction between sliding surfaces (i.e., high lubricity) and low wear between sliding surfaces. Suitable friction modifier materials include, but are not limited to, tungsten sulfide (e.g., $WS_2$), bismuth telluride (e.g., $Bi_2Te_3$), copper sulfide (e.g., $Cu_2S$), bismuth oxide (e.g., $BiO_3$) and combinations thereof. Of the friction modifiers, tungsten sulfide (e.g., $WS_2$), bismuth telluride (e.g., $Bi_2Te_3$) and bismuth oxide (e.g., $BiO_3$) are preferred.

Table 1 shows examples of antifriction coating materials according to the present invention. The examples shown are merely examples and do not limit the invention to the combinations of binders and friction modifiers shown therein. Examples 1–5, shown in Table 1, include coefficient of friction (COF) results for particular friction modifier and binder combinations. In order to determine the coefficient of friction, the antifriction coating materials are subject to a sliding wear test as known in the art. The tests were conducted with a stroke length of 0.150 inches, at room temperature. Five milliliters of antifriction coating material (i.e., binder and friction modifier) were loaded onto the wear surfaces. The wear surfaces were then subject to a load of 50 lbs. and the frequency was one Hertz for 1500 cycles for 25 minutes. The coefficients of friction were measured at various temperatures during the test and an average coefficient (i.e., Avg COF) of friction was calculated as the coefficient of friction for the wear system.

TABLE 1

| Example | Binder | Friction Modifier | COF Initial | COF room temp. | COF at 400° F. | COF at 750° F. | Avg COF |
|---|---|---|---|---|---|---|---|
| 1 | Titanium Oxide | $WS_2$ | 0.2 | 0.5 | 0.4 | 0.6 | 0.43 |
| 2 | Titanium Oxide | $Bi_2Te_3$ | 0.3 | 0.7 | 0.7 | 0.6 | 0.58 |
| 3 | Titanium Oxide | $BiO_3$ | 0.2 | 0.7 | 0.7 | 0.6 | 0.55 |
| 4 | Titanium Oxide | CuS | 0.3 | 0.6 | 0.7 | 0.6 | 0.55 |
| 5 | Aluminum Phosphate | $WS_2$ | 0.3 | 0.4 | 0.5 | 0.5 | 0.43 |

The friction modifier is preferably incorporated into the binder in a quantity of 1–50% by weight. The friction modifier is incorporated into the binder material and is preferably encapsulated in the binder material. Encapsulation may take place using any suitable encapsulation method, including, but not limited to powder metallurgical encapsulation methods. The binder incorporated with friction modifier is coated onto the surfaces subject to wear (i.e., wear surface). Suitable methods for coating include, but are not limited to, spraying or dipping the surface to be coated with a antifriction coating 370 and subsequently drying the antifriction coating 370. The dried surface forms an antifriction coating 370 that is tenacious and uniform across the wear surface. Optionally, the antifriction coating 370 may be heated during the drying step.

The variable stator vane assembly 310 of the present invention having the wear coating 360 and antifriction coating 370 combination preferably maintains a friction coefficient between the sliding surfaces at or below about 0.6 over the entire operating range of the variable stator vane 355. More preferably, the variable stator vane assembly 310 of the present invention maintains a friction coefficient between the sliding surfaces of below about 0.5 over the entire operating range of the variable stator vane 355. In particular, the antifriction coating 370 of the present invention preferably maintains a coefficient of friction of less than about 0.5 when in contact with the surface 430 of the wear coating or the surface 440 of the bushing in a reciprocating motion under a load at temperatures up to 800° F. (427° C.).

The variable stator vane assembly 310 of the present invention having the wear coating 360 and antifriction coating 370 combination preferably also is resistant to wear over the entire operating temperature range of the variable stator vane 355. In one embodiment of the present invention, the wear coating 360 and antifriction coating 370 combination according to the present invention results in wear to the vane assembly of less than about 0.005 inches over 2 million cycles (i.e., the number of times the surfaces are subject to rubbing friction) at temperatures up to about 800° F.

In another embodiment of the present invention, additives may be included in the antifriction coating 370 to provide additional desirable properties for the coating. The additional additive is an additive that provides desirable properties, such as increased lubricity, increased adhesion, or increased coating uniformity, to the composition. Suitable additional additives include, but are not limited to, polytetrafluoroethylene, adhesion promoters, dispersing agents and combinations thereof. Examples of additional additives include graphite, molybdenum sulfide, molybdenum diselenide and copper.

The combination of the wear coating 360 and antifriction coating 370 of the present invention assure reduced coefficients of friction, in the range of about 0.2 to about 0.6, over the life of the system. This is significant, as some conventional gas turbine engine systems have been designed to accommodate coefficients of friction as high as about 0.95, which occur as bushing and wear materials deteriorate during normal engine operation. Improvements in coefficient of friction permit the reduction in size, and hence weight of the actuation mechanism of the variable guide vanes, including the lever arms.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A variable gas turbine compressor vane assembly comprising:
   a case structure comprising a cavity;
   a compressor vane having a portion of the compressor vane at least partially disposed inside the cavity in the case structure, the portion of the compressor vane rotatably supported inside the cavity;
   a wear coating disposed on at least a portion of a surface of the compressor vane;
   a first antifriction coating disposed on the wear coating; and
   a bushing being disposed between the first antifriction coating and the case structure, the bushing being in sliding contact with each of the first antifriction coating and the case structure;
   wherein the first antifriction coating maintains a coefficient of friction between the first antifriction coating and the bushing of equal to or less than about 0.95 in atmospheres substantially devoid of water vapor.

2. The variable stator vane assembly of claim 1, wherein the first antifriction coating comprises a binder and a friction modifier.

3. The variable stator vane assembly of claim 2, wherein the binder is selected from the group consisting of sodium silicate, aluminum phosphate, titanium oxide and combinations thereof.

4. The variable stator vane assembly of claim 3, wherein the binder is aluminum phosphate.

5. The variable stator vane assembly of claim 3, wherein the binder is titanium oxide.

6. The variable stator vane assembly of claim 2, wherein the friction modifier is selected from the group consisting of tungsten sulfide, bismuth telluride, copper sulfide, bismuth oxide and combinations thereof.

7. The variable stator vane assembly of claim 6, wherein the friction modifier is tungsten sulfide.

8. The variable stator vane assembly of claim 1, wherein the bushing comprises a material selected from the group consisting of tungsten carbide, silicon nitride, zirconium oxide, cobalt-chromium-molybdenum alloys and combinations thereof.

9. The variable stator vane assembly of claim 1, wherein the wear coating comprises a material selected from the group consisting of tungsten carbide, cobalt-containing tungsten carbide, titanium nitride, and combinations thereof.

10. The variable stator vane assembly of claim 9, wherein the wear coating comprises cobalt-containing tungsten carbide.

11. The variable stator vane assembly of claim 9, wherein the wear coating is titanium nitride.

12. The variable stator vane assembly of claim 1, wherein the coefficient of friction between the first antifriction coating and the bushing of equal to or less than about 0.6 in atmospheres substantially devoid of water vapor.

13. The variable stator vane assembly of claim 1, wherein the coefficient of friction between the first antifriction coating and the bushing of equal to or less than about 0.95 at temperatures up to about 1000° F.

14. The variable stator vane assembly of claim 1, wherein the coefficient of friction between the first antifriction coating and the bushing of equal to or less than about 0.6 at temperatures up to about 1000° F.

15. The variable stator vane assembly of claim 1, wherein the coefficient of friction between the first antifriction coating and the bushing of equal to or less than about 0.95 at temperatures up to about 1200° F.

16. The variable stator vane assembly of claim 1, wherein the coefficient of friction between the first antifriction coating and the bushing of equal to or less than about 0.6 at temperatures up to about 1200° F.

17. The variable stator vane assembly of claim 1, wherein the wear coating and compressor vane wear a total of less than 0.005 inches over 2 million rotations of the compressor vane.

18. The variable stator vane assembly of claim 1, further comprising a second antifriction coating disposed on a surface of the bushing, wherein the second antifriction is in sliding contact with the first antifriction coating.

19. A variable gas turbine compressor vane assembly comprising:
 a case structure comprising a cavity;
 a compressor vane having a portion of the compressor vane at least partially disposed inside the cavity in the case structure, the portion of the compressor vane rotatably supported inside the cavity;
 a wear coating disposed on at least a portion of a surface of the compressor vane;
 an antifriction coating disposed on a bushing; and
 the bushing being disposed between the antifriction coating and the case structure, the bushing being in sliding contact with the case structure and the antifriction coating being in sliding contact with the wear coating;
 wherein the antifriction coating maintains a coefficient of friction between the first antifriction coating and the bushing of equal to or less than about 0.95 in atmospheres substantially devoid of water vapor; and
 wherein the first antifriction coating comprises a binder and a friction modifier, the binder being selected from the group consisting of sodium silicate, aluminum phosphate, titanium oxide and combinations thereof.

20. The variable stator vane assembly of claim 19, wherein the binder is aluminum phosphate.

21. The variable stator vane assembly of claim 19, wherein the binder is titanium oxide.

22. The variable stator vane assembly of claim 19, wherein the friction modifier is selected from the group consisting of tungsten sulfide, bismuth telluride, copper sulfide, bismuth oxide and combinations thereof.

23. The variable stator vane assembly of claim 22, wherein the friction modifier is tungsten sulfide.

24. The variable stator vane assembly of claim 19, wherein the bushing comprises a material selected from the group consisting of tungsten carbide, silicon nitride, zirconium oxide, cobalt-chromium-molybdenum alloys and combinations thereof.

25. The variable stator vane assembly of claim 19, wherein the wear coating comprises a material selected from the group consisting of tungsten carbide, cobalt-containing tungsten carbide, titanium nitride, and combinations thereof.

26. The variable stator vane assembly of claim 25, wherein the wear coating comprises cobalt-containing tungsten carbide.

27. The variable stator vane assembly of claim 25, wherein the wear coating is titanium nitride.

28. The variable stator vane assembly of claim 19, wherein the coefficient of friction between the antifriction coating and the bushing of equal to or less than about 0.6 in atmospheres substantially devoid of water vapor.

29. The variable stator vane assembly of claim 19, wherein the coefficient of friction between the antifriction coating and the bushing of equal to or less than about 0.95 at temperatures up to about 1000° F.

30. The variable stator vane assembly of claim 19, wherein the coefficient of friction between the antifriction coating and the bushing of equal to or less than about 0.6 at temperatures up to about 1000° F.

31. The variable stator vane assembly of claim 19, wherein the coefficient of friction between the antifriction coating and the bushing of equal to or less than about 0.95 at temperatures up to about 1200° F.

32. The variable stator vane assembly of claim 19, wherein the coefficient of friction between the antifriction coating and the bushing of equal to or less than about 0.6 at temperatures up to about 1200° F.

33. The variable stator vane assembly of claim 19, wherein the wear coating and compressor vane wear a total of less than 0.005 inches over 2 million rotations of the compressor vane.

* * * * *